United States Patent
Courbon (10) Patent No.: US 7,318,650 B2
(45) Date of Patent: Jan. 15, 2008

(54) TAPERED TUBE LOCK CONNECTOR FOR A VEHICLE MIRROR MOUNTING ASSEMBLY

(75) Inventor: Emmanuel Courbon, Columbia, SC (US)

(73) Assignee: Lang-Mekra North America, LLC, Ridgeway, SC (US)

(*) Notice: Subject to any disclaimer, the term of this patent is extended or adjusted under 35 U.S.C. 154(b) by 308 days.

(21) Appl. No.: 11/157,778

(22) Filed: Jun. 21, 2005

(65) Prior Publication Data

US 2006/0285234 A1    Dec. 21, 2006

Related U.S. Application Data

(60) Provisional application No. 60/686,388, filed on Jun. 1, 2005.

(51) Int. Cl.
*G02B 7/182*    (2006.01)

(52) U.S. Cl. ..................................... 359/872

(58) Field of Classification Search .................... None
See application file for complete search history.

(56) References Cited

U.S. PATENT DOCUMENTS

| | | | |
|---|---|---|---|
| 2,463,124 A | 3/1949 | Sims | |
| 2,859,056 A | 11/1958 | Marks | |
| 3,424,424 A | 1/1969 | Kelley | |
| 3,644,021 A | 2/1972 | Hamby | |
| 4,759,620 A * | 7/1988 | Sakuma et al. | ............. 359/841 |
| 5,039,055 A | 8/1991 | Lempelius | |
| 5,779,386 A | 7/1998 | Eichhorn | |
| 2002/0117228 A1 * | 8/2002 | Nakajima et al. | ........... 138/153 |
| 2005/0012018 A1 | 1/2005 | Courbon | |

FOREIGN PATENT DOCUMENTS

| EP | 0 729 879 A | 9/1996 |
|---|---|---|
| EP | 06 01 1277 | 10/2006 |
| WO | WO 92/21886 A | 12/1992 |

* cited by examiner

*Primary Examiner*—Euncha P. Cherry
(74) *Attorney, Agent, or Firm*—McNair Law Firm, P.A.; Seann P. Lahey (57) ABSTRACT

A mounting connector having a tapered tube lock bore formed therein. A mirror support arm having a connector tube adapted to be received in the tube lock bore in a pressure fit arrangement. A longitudinal compression slot included in the connector tube extending along a portion of the length of the connector tube for being inserted into the tube lock bore. The compression slot being deformed under pressure during fitting of the first end portion into the tube lock bore causing the connector tube to conform to the taper of the tube lock bore so that the pressure between the connector tube and the tube lock bore locks them together.

26 Claims, 7 Drawing Sheets

TAPERED TUBE LOCK CONNECTOR FOR A VEHICLE MIRROR MOUNTING ASSEMBLY

CROSS REFERENCE TO RELATED APPLICATION

This application claims priority from a provisional application filed Jun. 1, 2005 under Ser. No. 60/686,388 having the same title.

BACKGROUND OF THE INVENTION

1) Field of the Invention

The present invention relates to vehicle mirror assemblies, and more particularly, to a mirror mounting connector for attaching a mirror support arm to a vehicle mount attached to the vehicle body.

2) Description of Related Art

A problem with large exterior side view vehicle mirror assemblies carried by commercial tractor-trailers and other large vehicles is that the vehicles produce constant vibration, which caused certain connection points of the mirror assembly to loosen over time. Some vehicle mirror assembly types includes large tubular frame member that acts as a mirror support arm, which carries a mirror head with one or more mirror panes. The tube frame includes a connector tube portion that is carried by a mirror mounting connector which is then affixed to a vehicle mount. The connection between the connector tube portion of the mirror support arm and the mirror mounting connector is one area of concern with these mirror types where vibrations cause the components to loosen and obtaining a tight fit during assembly is difficult to due variations in tube size from batch to batch.

Typically, the connection between the connector tube and the mirror mounting connector is accomplished by one of several ways. One way of connecting these components is by precisely milling the diameters of the tube connector and the mirror mounting connector bore which receives the tube. The two pieces are then press fit together which essentially jams the connector tube into the mirror mounting connector tight enough to hold them together. The press fit method can result in numerous problems, however, such as the cracking and breaking of parts under pressure. While this precise milling can obtain a tight connection when done properly, it is expensive and time consuming to manufacture parts using this method. When the press fit does not provide a tight connection, screws have been used to attempt to resolve the problem by tightening the components together, but it has been found that over time the screws can loosen up through vibration and cause the parts to wear on each other and eventually fail.

Another way of attaching the tube frame to the tube connector involves the use of glues, which is useful in filing gaps between the components. Gluing the parts together, however, presents many manufacturing problems as the components must sit a certain amount of time to cure. Additionally, gluing is an expensive attempt to solve the problem and has not produced a dependable solid vibration resistant connection.

Another type of connection used in vehicle mirror assemblies involves cutting notches into the tube connector and then press fitting the mirror mounting connector around the tube connector and into the notches. This has had some success when using carbon steel tubing with minimal rebound memory. Stainless steel tubing, however, springs back to far to provide a reliable tight connection. Pressing the steel tubing far enough to compensate for this spring back typically breaks the tube connector, which is usually made of aluminum.

U.S. Pat. No. 2,463,124 discloses a connection between two tubular members wherein a male member is provided with a reduced end to fit within a corresponding receptacle of a female member having a corresponding conical surface to engage the reduced end in a frictional engagement. The connection is tightened using a nut and bolt.

U.S. Pat. No. 5,799,386 discloses joining tubes wherein one tube has a smaller diameter joined with a second tube of a larger diameter. U.S. Pat. Nos. 5,039,055; 3,644,021; and 3,424,424 show various support arms and complimentary structure for vehicle mirror assemblies.

Accordingly, it is an object of the present invention to provide a mirror mounting connector for a vehicle mirror assembly that forms a tight vibration resistant connection with the connector tube in a cost efficient manner and that can compensate for changes in tube dimensions while still maintaining a tight fit between components.

SUMMARY OF THE INVENTION

The above objectives are accomplished according to the present invention by providing a mirror mounting connector including a tapered tube lock bore formed in the mounting connector. A connector tube is provided that is adapted to be received in the tube lock bore in a pressure fit arrangement. A longitudinal compression slot is included in the connector tube extending along a portion of the length of the connector tube for being inserted into the tube lock bore. The compression slot is deformed under pressure during fitting of the connector tube into the tube lock bore causing the connector tube to conform to the taper of said tube lock bore so that the pressure between said connector tube and tube lock bore locks them together.

In a preferred embodiment, the compression slot includes an open condition prior to pressure fitting with the tube lock bore wherein the connector tube is cylindrical with a constant diameter. Further, the compression slot includes a closed condition when the connector tube is fitted together with the tube lock bore wherein the connector tube is compressed to a conical form having a variable diameter conforming to the taper of the tube lock bore.

In a preferred embodiment, the compression slot is tapered inward from a distal end of the connector tube. In a most advantageous embodiment, the compression slot is tapered at an angle of between 0° to 10°. Additionally, it is most preferred that the tube lock bore is tapered at an angle of between 0° to 10°.

In an alternative embodiment, a plurality of compression slots may be provided in a circumferentially spaced equidistant arrangement on the connector tube.

In a preferred embodiment, a fracture control opening is positioned at a terminal end of the compression slot for preventing the formation and propagation of cracks in the connector tube resulting from deformation during fitting with the tube lock bore.

Advantageously, the compression slot may be constructed and arranged to close in a continuous manner when the connector tube is fit into the tube lock bore so that no opening remains in the compression slot after insertion into the tube lock bore. Alternatively, the compression slot may be constructed and arranged to close in a discontinuous manner when the connector tube is fit into the tube lock bore so that only a portion of the compression slot is completely closed.

In the preferred embodiment, a connecting bore is formed in the mounting connector for receiving a connecting bolt that engages a vehicle mounted attachment. Preferably, the connecting bore extends into the tube lock bore to provide a continuous passage between the connecting bore and the tube lock bore. In this arrangement, the connector tube may be provided with a securing slot aligning with the connecting bore when inserted into the tube lock bore to maintain the continuous passage. The connecting bolt can be provided to extend from the connecting bore into the securing slot to prevent the connector tube from separating from the tube lock bore once assembled.

In a further advantageous embodiment, a tube stop is carried in the tube lock bore for preventing the connector tube from over insertion into the tube lock bore.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
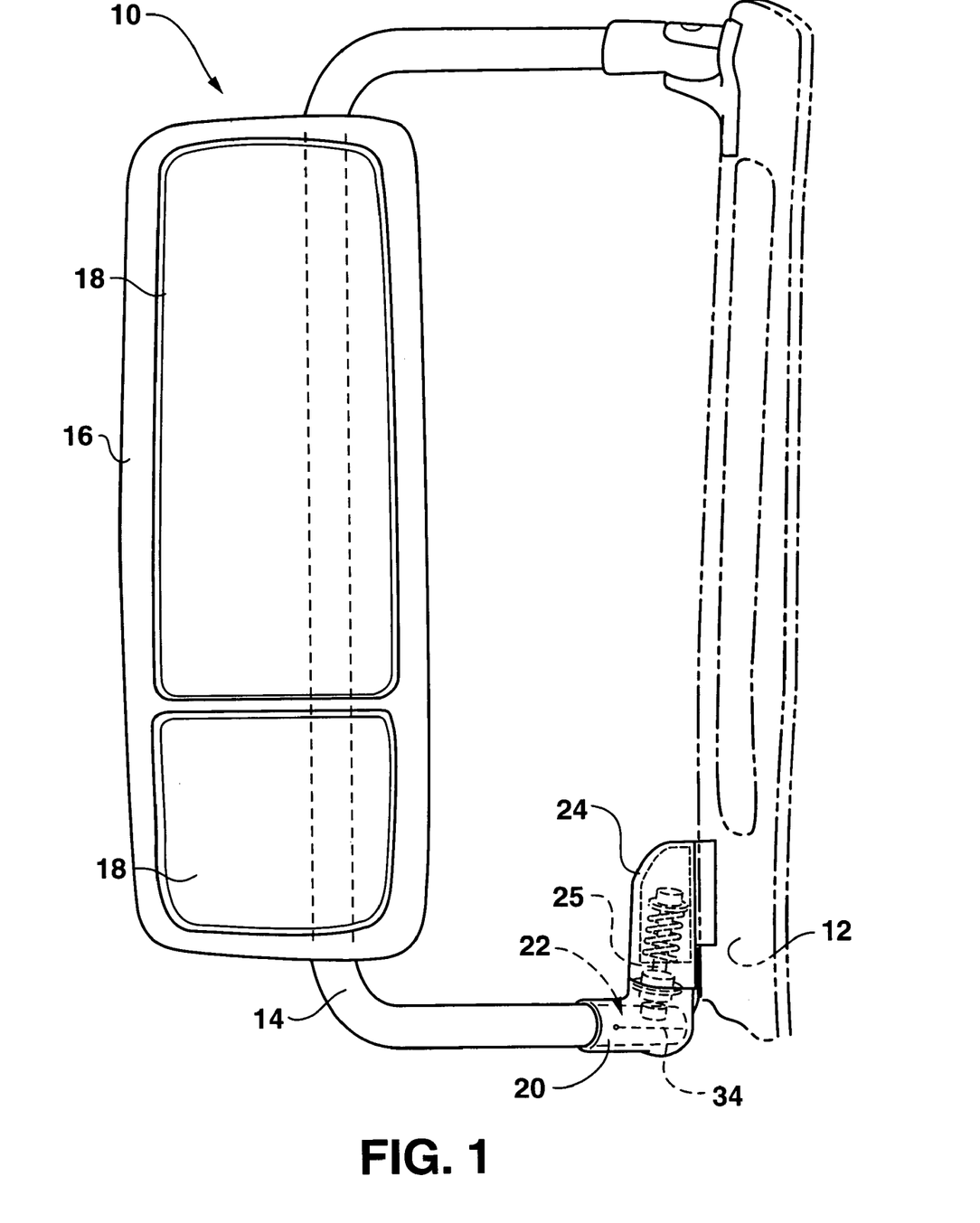
FIG. 1 show a perspective view of a mirror assembly for attachment to a vehicle according to the present invention.

With reference to the drawings, the invention will now be described in more detail. Referring to FIG. 1, a vehicle mirror assembly, designated generally as 10, is shown mounted to a vehicle body 12. The mirror assembly includes a mirror support arm 14, which carries a mirror head 16 housing one or more mirror panes 18. A mirror mounting connector 20 is disposed at a distal end of mirror support arm 14. A connector tube 22 is included in mirror support arm 14 and is illustrated being received in mirror mounting connector 20. Mirror mounting connector 20 is further connected to a vehicle mounted attachment 24 by way of a connecting bolt 25. Accordingly, mirror mounting connector 20, connector tube 22 and attachment 24 operate to carry mirror support arm 14 and mirror head 16 on the vehicle body.

Figures 2, 3A:
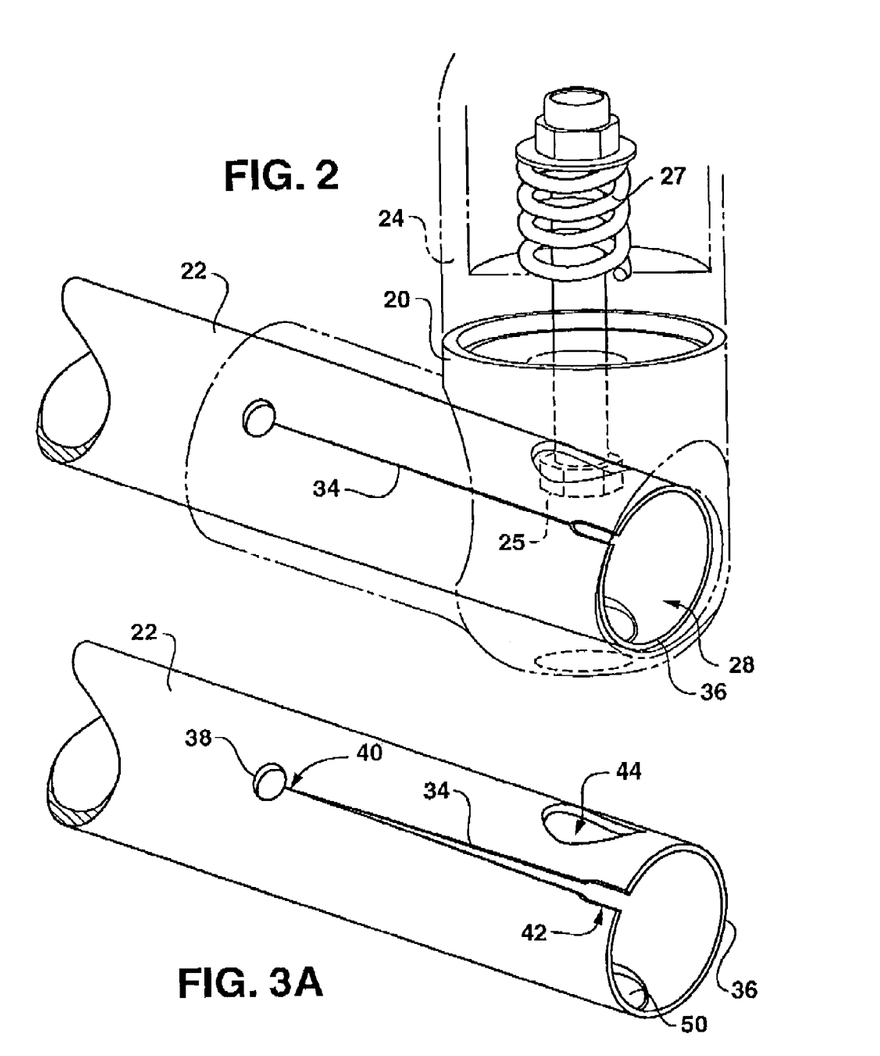
FIG. 2 shows a detailed perspective view of a mirror mounting connector according to the present invention.
FIGS. 3A-C shows detailed perspective views of a connector tube according to the present invention.
Figure 5A:
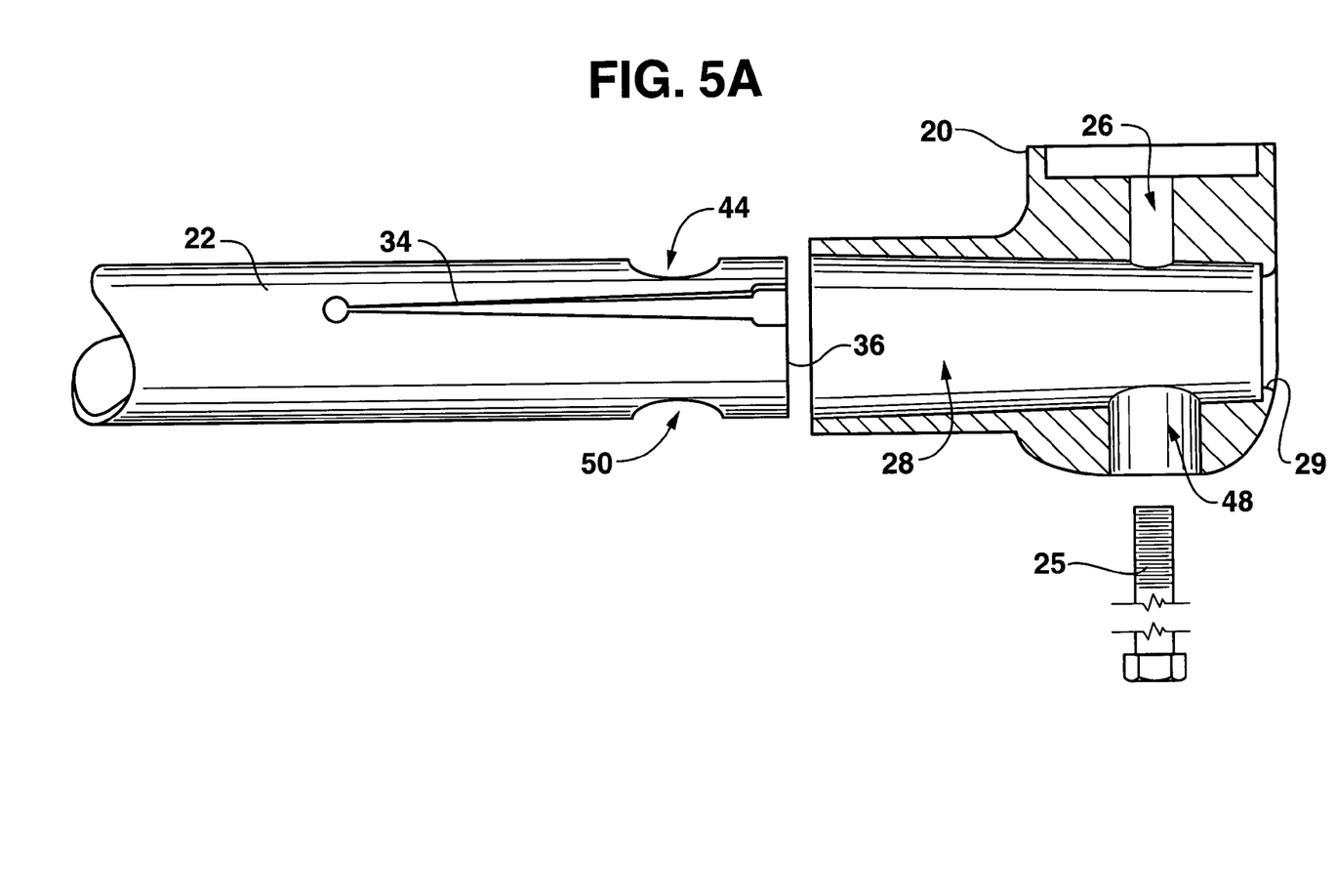
FIG. 5A shows an exploded cross-section view of the mirror mounting connector prior to fitting in a tube lock bore according to the present invention.
Figure 5B:
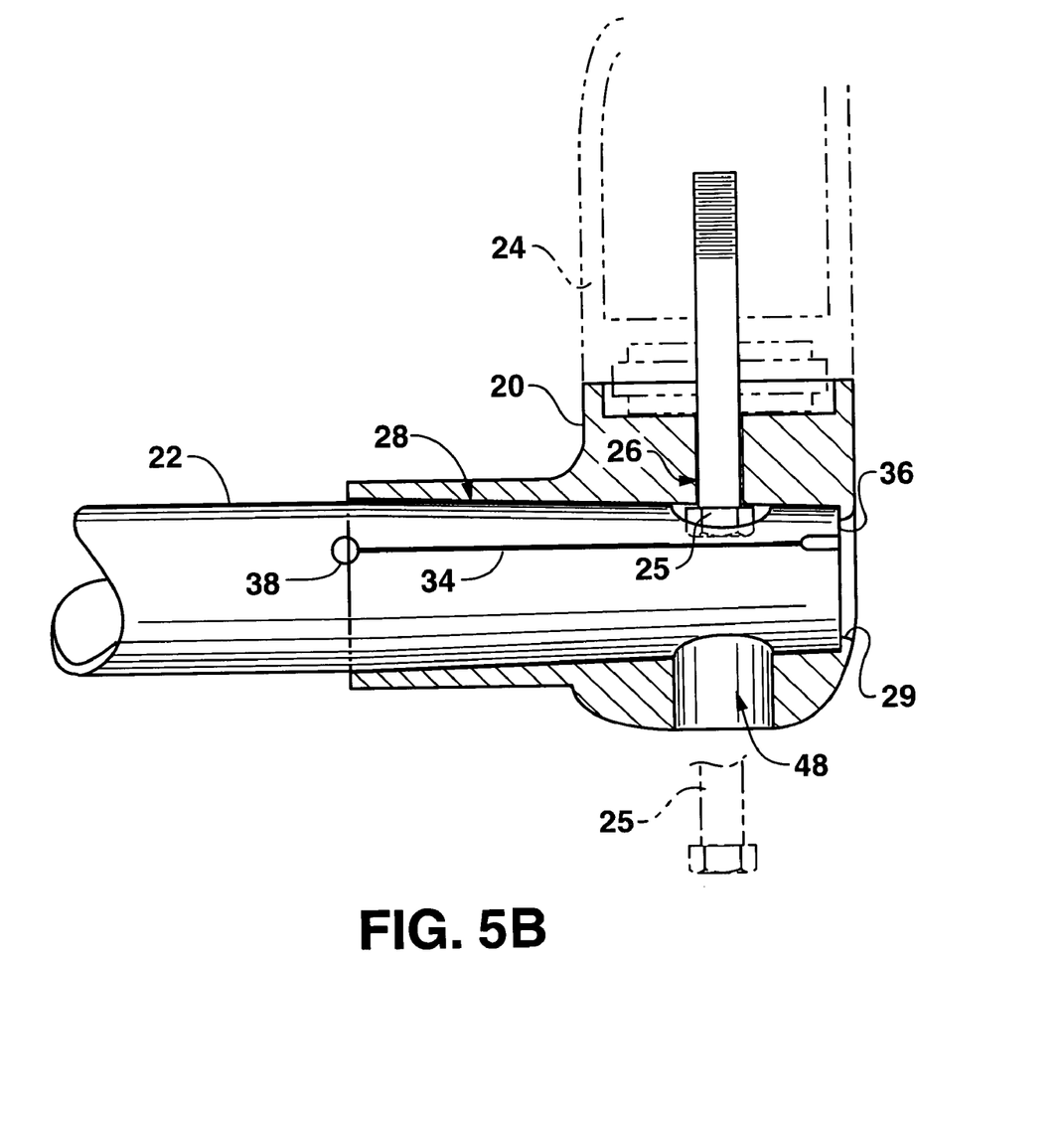
FIG. 5B shows a cross-section view of the mirror mounting connector after fitting according to the present invention; and, FIG. 5C shows a cross-section view of the mirror mounting connector after fitting wherein the connecting bolt prevents withdraw of the connector tube according to the present invention.

Referring to FIGS. 5A and 5B, mirror mounting connector 20 is constructed to include a connecting bore 26 formed in the mounting connector for carrying connecting bolt 25. Connecting bolt 25 is adapted for engaging or otherwise securing mirror mounting connector 20 to vehicle mounted attachment 24. Connecting bore 26 is formed generally along a vertically oriented axis through mirror mounting connector 20. In a preferred embodiment, a swiveling connection is provided between vehicle mounted attachment 24 and mirror mounting connector 20 to allow mirror head 16 to rotate for proper viewing alignment and adjustment. A detent system is typically provided between mirror mounting connector 20 and vehicle mounted attachment 24. As shown in FIG. 2, a spring 27 may be used to bias connecting bolt 25 into vehicle mounted attachment 24 while allowing for some play between the components for rotation when using a typical detent locking mechanism.

In order to provide a tight vibration resistant connection between mirror mounting connector 20 and tube connector 22 a tapered tube lock bore 28 is formed in mirror mounting connector 20 for receiving connector tube 22. Tube lock bore 28 is formed along a generally horizontal axis through mirror mounting connector 20 and intersects connecting bore 26. In a preferred embodiment, tube lock bore 28 is tapered at an angle of between 0° to 10°. Tapering the tube lock bore greater than 10° begins to degrade the effectiveness of the engagement between connector tube 22 and mirror mounting connector 20, which can lead to separation between the components. It is most advantageous to taper tube lock bore 28 at an angle of approximately 3°, which has been found to produce a tight vibration resistant connection between the components.

Referring to FIG. 5B, connector tube 22 is inserted into tube lock bore 28 in a pressure fit arrangement. A tube stop 29 is carried in tube lock bore 28 for preventing connector tube 22 from over insertion into the tube lock bore. Preferably tube stop 29 is an annular ridge protruding from the interior circumference of tube lock bore 28, but various alternatives known to those skilled in the art may also be employed to prevent connector tube 22 from being over inserted.

Referring to FIGS. 2, 3A and 5A, a longitudinal compression slot 34 is included in connector tube 22 extending along a portion of the length of the connector tube for being inserted into tube lock bore 28. When connector tube 22 is pressure fit into tube lock bore 28, as in FIG. 2, the compression slot is deformed under the pressure of fitting into the tapered tube lock bore 28, which causes compression slot 34 to close and conform connector tube 22 to the taper of tube lock bore 28 so that a uniform fit is provided between the bore and the connector tube. The effect of the tapered arrangement and compression of compression slot 34 locks connector tube 22 into tube lock bore 28.

Referring to FIGS. 5A and 5B, as well as FIGS. 2 and 3A, compression slot 34 includes an open condition prior to pressure fitting with the tube lock bore wherein connector tube 22 is cylindrical with a constant diameter. Further, compression slot 34 also has a closed condition when connector tube 22 is fitted together with tube lock bore 28 wherein connector tube 22 is compressed to a conical form having a variable diameter conforming to the taper of tube lock bore 28 which results in pressure between the components that lock connector tube 22 into tube lock bore 28.

Additionally, compression slot 34 is tapered to narrow inward from distal end 36 of connector tube 22. Preferably, as with the taper of tube lock bore 28, compression slot 34 is tapered at an angle of between 0° to 10°. Most advantageously, compression slot 34 is tapered at an angle of approximately 3°, which provides an effective lock between the components in combination with the taper of tube lock bore 28. In an alternative arrangement as shown in FIG. 3C, a plurality of compression slots 34 may be provided that are circumferentially spaced in an equidistant arrangement on connector tube 22. Adding additionally compression slots can make joining of the components easier, but the strength of the lock created by the taper of tube lock bore 28 is reduced. It is accordingly preferred to use only a single compression slot. Advantageously, the compression slot allows connector tube 22 to be more tolerant of variations in the diameter of connector tube 22, as well as tube lock bore 28. It is typical to see small differences from batch to batch of tube. These small difference have a large impact on the tightness of the fit between connector tube 22 and tube lock bore 28. By adjusting the size of compression slot 34, it is possible to adjust the fit between these components.

Figure 3B:
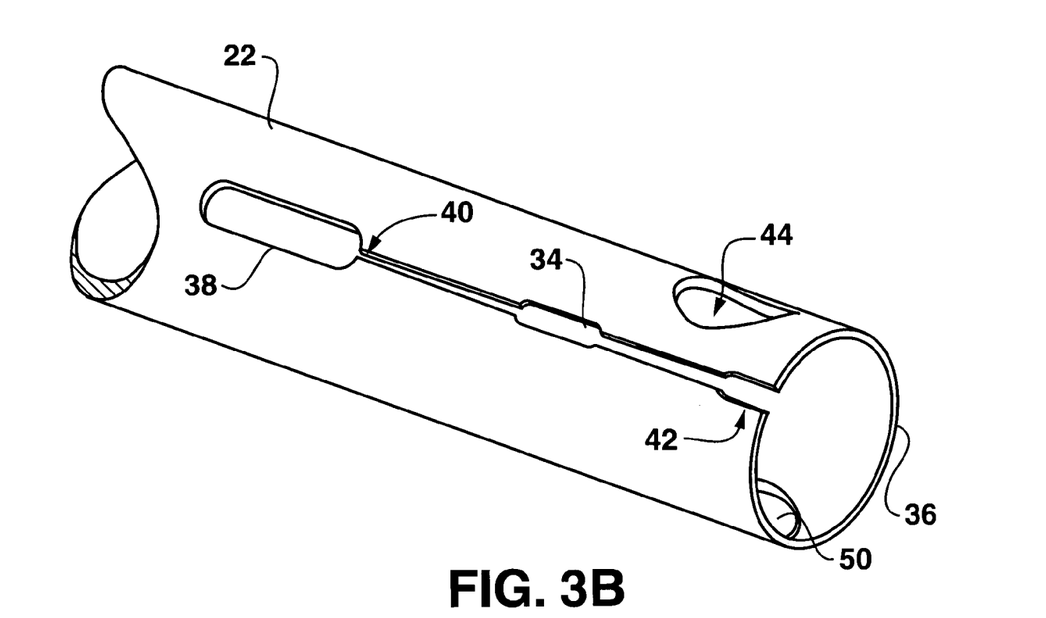
Figure 3C:
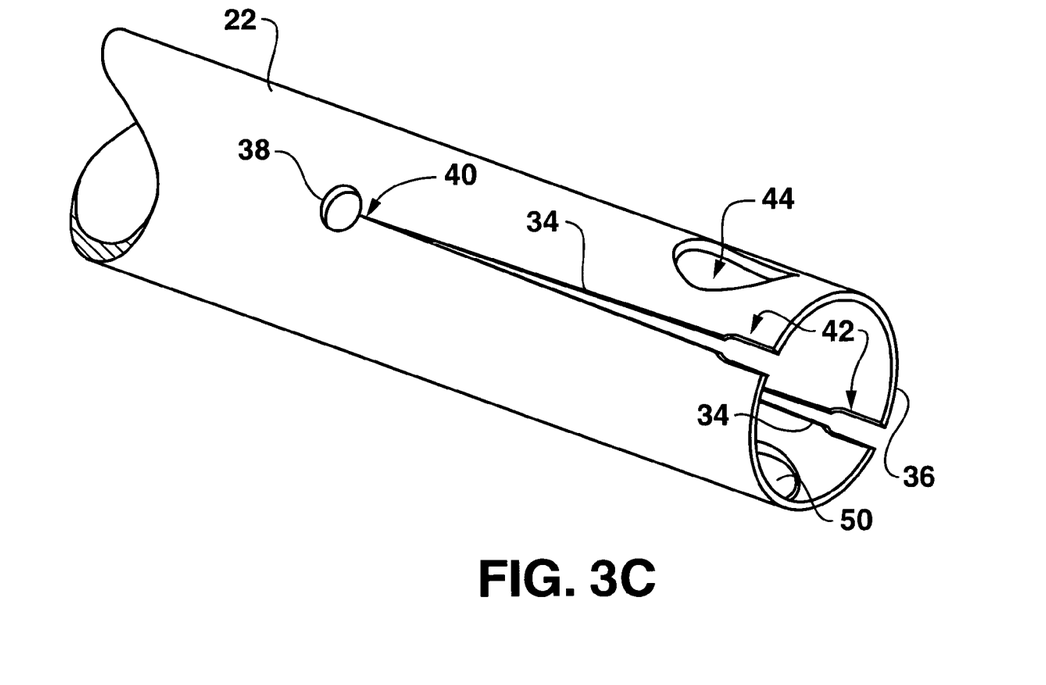

Referring to FIGS. 3A and 3B, a fracture control opening 38 is positioned at a terminal end, designated generally as 40, of compression slot 34 for preventing the formation and propagation of cracks in connector tube 22 resulting from deformation of compression slot 22 during pressure fitting with tapered tube lock bore 28. As shown in FIG. 3A, fracture control opening is circular in shape, which allows for compression slot 34 to close without a fracture forming in connector tube 22 at distal end 40 of compression slot 34. Alternatively, as shown in FIG. 3B, fracture control opening 38 may be a more elongated shape that extends longitudinally with compression slot 34. This arrangement provides improved control over the prevention of fracture formation and additionally control to prevent the spread of cracks that may have formed.

Referring to FIG. 2, in a preferred embodiment, compression slot 34 is constructed and arranged to close in a continuous manner when connector tube 22 is fit into tube lock bore 28 so that no opening remains in compression slot 34 after insertion into tube lock bore 28, with the exception of dado 42 which results from typically manufacturing processes and is not considered to define a portion of compression slot 34 for purposes of describing the continuous closed contact as shown in FIG. 2. By tapering tube lock bore 28 at 3° and tapering compression slot 34 at 3°, the slot is completely closed to provide the tightest possible connection for a taper lock arrangement. Alternatively, however, referring to FIG. 3B, compression slot 34 may be constructed and arranged to closed in a discontinuous manner when fit into tube lock bore 28 so that only a portion of compression slot 34 is completely closed. This arrangement typically produces a less tight fit between the components as compared to when compression slot 34 is completely closed when inserted, but can be useful in accommodating variations in the tube diameter.

Figure 4:
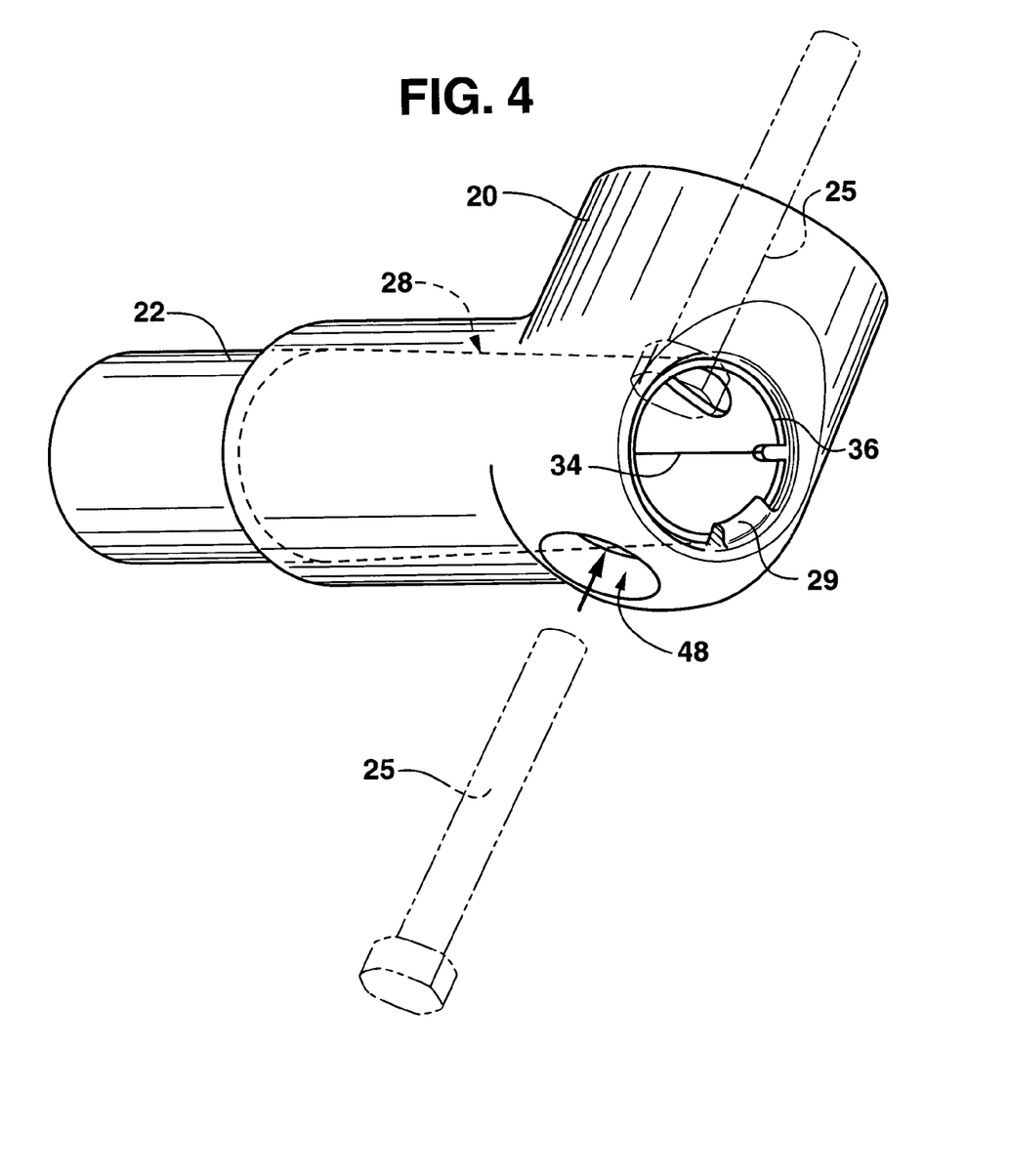
FIG. 4 shows a detailed perspective view of the mirror mounting connector shown in FIG. 2 at a different angle to illustrate insertion of a connection bolt according to the present invention.
Figure 5C:
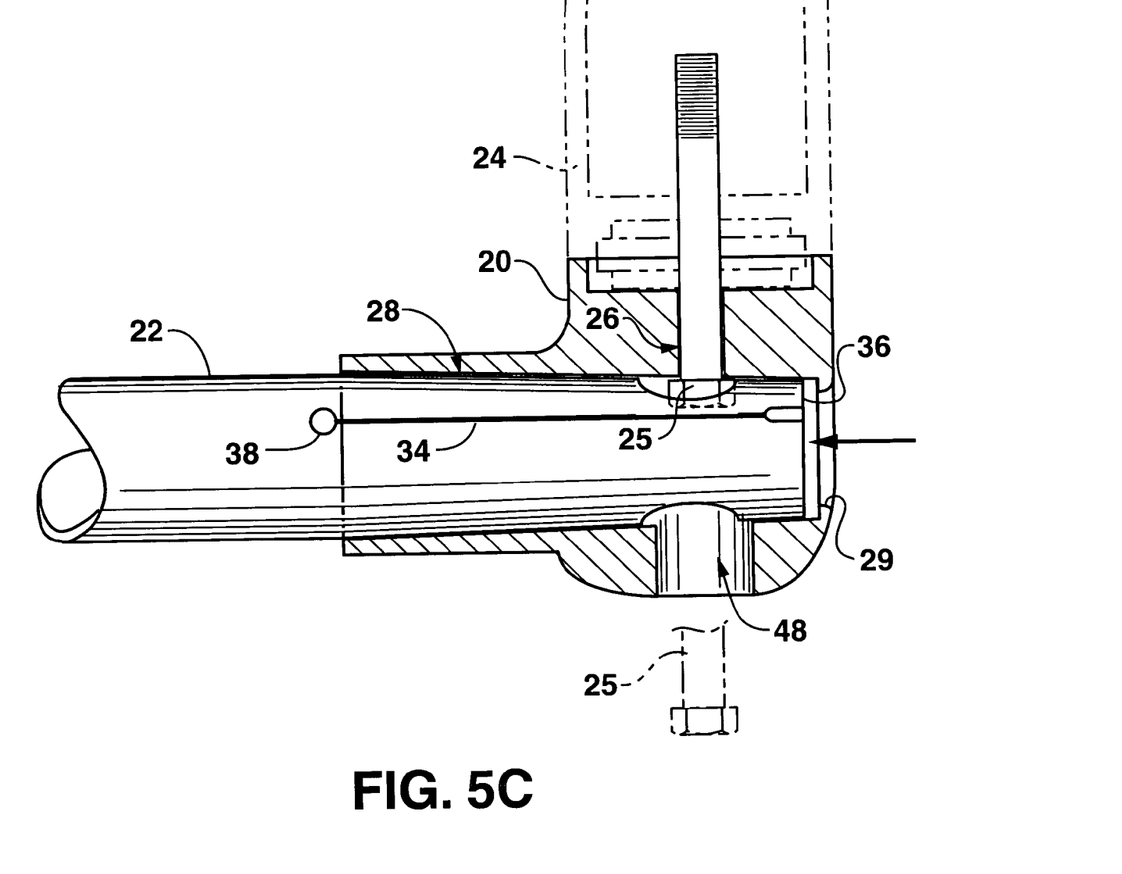

In a most advantageous embodiment, referring to FIG. 5a, connecting bore 26 extends into tube lock bore 28 to provide a continuous passage between connecting bore 26 and tube lock bore 28. Referring to FIG. 5A, connector tube 22 is provided with a securing slot 44 disposed toward distal end 36 for aligning with connecting bore 26 when inserted into tube lock bore 28. As shown in FIG. 5B, a connecting bolt 25 is received into securing slot 44. Connecting bolt 25 prevents connector tube 22 from separating from tube lock bore 28 by extending into securing slot 44, as best shown in FIG. 5C. Referring to FIG. 4, to provide for easy insertion of connecting bolt 25 into connecting bore 26, mirror mounting connector 20 includes a hole 48 aligned with connecting bore 26 on the opposite face of tube lock bore 28. Additionally, tube connector 20 includes an additional opening 50 opposite securing slot 44 for allowing connecting bolt 25 to pass through connector tube 22 and into connecting bore 26.

While a preferred embodiment of the invention has been described using specific terms, such description is for illustrative purposes only, and it is to be understood that changes and variations may be made without departing from the spirit or scope of the following claims.

What is claimed is:

1. In a vehicle mirror assembly including a mirror support arm and a mirror head carried on the mirror support arm, a mirror mounting connector comprising:
   a tapered tube lock bore formed in said mounting connector;
   a connector tube included in said mirror support arm adapted to be received in said tube lock bore in a pressure fit arrangement; and,
   a longitudinal compression slot included in said connector tube extending along a portion of the length of said connector tube for being inserted into said tube lock bore;
   a fracture control opening positioned at a terminal end of said compression slot for preventing the formation and propagation of cracks in said connector tube resulting from deformation during fitting with said tube lock bore; and
   wherein said compression slot is deformed under pressure during fitting of said connector tube into said tube lock bore causing said connector tube to conform to the taper of said tube lock bore so that the pressure between said connector tube and tube lock bore locks them together.

2. The mirror mounting connector of claim 1 wherein said compression slot includes an open condition prior to pressure fitting with said tube lock bore wherein said connector tube is cylindrical with a constant diameter.

3. The mirror mounting connector of claim 2 wherein said compression slot includes a closed condition when said connector tube is fitted together with said tube lock bore wherein said connector tube is compressed to a conical ton having a variable diameter conforming to the taper of said tube lock bore.

4. The mirror mounting connector of claim 1 wherein said compression slot is tapered inward from a distal end of said connector tube.

5. The mirror mounting connector of claim 1 wherein said compression slot is tapered at an angle of between 0° to 10°.

6. The mirror mounting connector of claim 1 wherein said tube lock bore is tapered at an angle of between 0° to 10°.

7. The mirror mounting connector of claim 1 including a plurality of compression slots circumferentially spaced in an equidistant arrangement on said connector tube.

8. The mirror mounting connector of claim 1 wherein said compression slot is constructed and arranged to close in a continuous manner when said connector tube is fit into said tube lock bore so that no opening remains in said compression slot after insertion into said tube lock bore.

9. The mirror mounting connector of claim 1 wherein said compression slot is constructed and arranged to close in a discontinuous manner when said connector tube is fit into said tube lock bore so that only a portion of said compression slot is completely closed.

10. The mirror mounting connector of claim 1 including a connecting bore formed in said mounting connector for receiving a connecting bolt that engages a vehicle mounted attachment.

11. The mirror mounting connector of claim 10 wherein said connecting bore extends into said tube lock bore to provide a continuous passage between said connecting bore and said tube lock bore.

12. The mirror mounting connector of claim 11 wherein said connector tube includes a securing slot aligning with said connecting bore when inserted into said tube lock bore to maintain said continuous passage.

13. The mirror mounting connector of claim 12 wherein said connecting bolt extends from said connecting bore into said securing slot to prevent said connector tube from separating from said tube lock bore once assembled.

14. The mirror mounting connector of claim of claim 1 including a tube stop carried in said tube lock bore for preventing said connector tube from over insertion into said tube lock bore.

15. A vehicle mirror assembly comprising:
   a mirror head carrying at least one mirror pane;
   a mirror support arm carrying said mirror head;
   a mirror mounting connector including:
      a tapered tube lock bore formed along a first axis; and,
      a connecting bore formed along a second axis at an angle to said first axis so that said connecting bore intersects said tube lock bore;
   a connecting bolt carried in said connecting bore for attaching said mirror mounting connector to a vehicle mounted attachment;
   a connector tube included in said mirror support arm received in said tube lock bore in a pressure fit arrangement; and,
   a compression slot included in said connector tube being received into said tube lock bore so that said connector tube is compressed upon insertion into said tube lock bore causing said compression slot to reduce and conform said connector tube to the taper of said tube lock bore to provide a tight uniform connection for supporting said mirror support arm.

16. The mirror assembly of claim 15 including a fracture control opening positioned at a terminal end of said compression slot for preventing the formation and propagation of cracks in said connector tube resulting from deformation during fitting with said tube lock bore.

17. The mirror assembly of claim 16 wherein said connecting bore extends into said tube lock bore to provide a continuous passage between said connecting bore and said tube lock bore.

18. The mirror assembly of claim 17 wherein said connector tube includes a securing slot disposed in said first end portion for being aligned with said connecting bore to receive said connecting bolt to prevent said connector tube from separating from said tube lock bore.

19. The mirror assembly of claim 18 wherein said tube lock bore is tapered at an angle of between 0° to 10° and said compression slot is tapered inward from a distal end of said connector tube at an angle of between 0° to 10°.

20. The mirror assembly of claim 15 wherein said compression slot includes an open condition prior to pressure filling with said tube lock bore wherein said connector tube is cylindrical with a constant diameter.

21. The mirror assembly of claim 20 wherein said compression slot includes a closed condition when said connector tube is fitted together with said tube lock bore wherein said connector tube is compressed to a conical form having a variable diameter conforming to the taper of said tube lock bore.

22. A method for mounting a vehicle mirror assembly comprising the steps of:
   providing a mirror support arm for carrying a mirror head;
   providing a mirror mounting connector having a tapered tube lock bore formed along a first axis and a connecting bore formed along a second axis at an angle to said first axis so that said connecting bore intersects said tube lock bore;
   providing a connector tube carded by said mirror support am, having a compression slot;
   pressure fitting said first end portion of said connector tube into said tube lock bore so that said connector tube is compressed upon insertion into said tube lock bore causing said compression slot to reduce and conform said first end portion of said connector tube to the taper of said tube lock bore to provide a tight uniform connection.

23. The method of claim 22 including the step of forming said connecting bore to extend into said tube lock bore to provide a continuous passage between said connecting bore and said tube lock bore.

24. The method of claim 23 including the step of aligning a securing slot disposed in said connector tube with said connecting bore.

25. The method of claim 24 including the step of inserting a connecting bolt into said connector bore for attaching said mirror mounting connector to a vehicle mounted attachment.

26. The method of claim 25 including the step of positioning said connecting bolt so that it extends into said securing slot to prevent said connector tube from separating from said tube lock bore.

* * * * *